INVENTOR
HISANORI ATAKA
YOHEI IKEZU

United States Patent Office
3,620,147
Patented Nov. 16, 1971

3,620,147
PHOTOMETRIC DEVICE FOR PHOTOMETERING WITHIN A POLOMIRROR BODY FOR USE WITH A SINGLE-LENS REFLEX CAMERA
Hisanori Ataka and Yohei Ikezu, Tokyo, Japan, assignor to Kabushiki Kaisha Ricoh, Tokyo, Japan
Filed Sept. 19, 1968, Ser. No. 760,865
Int. Cl. G03b 19/12
U.S. Cl. 95—42
6 Claims

ABSTRACT OF THE DISCLOSURE

An exposure meter device for use with a single-lens reflex camera wherein the viewfinder system includes a polomirror body (hollow polyhedron formed of plastic material or the like and provided with internal light reflecting surfaces), and a light receiving member is located within or movable into the polomirror and positioned in the optical path of the viewfinder.

BACKGROUND OF THE INVENTION

The present invention relates to a photometric device for use with a single-lens reflex camera and more particularly a photometric device for use with a single-lens reflex camera wherein photometering is effected by the lights in the light path of a viewfinder in a polomirror body (hollow polyhedron provided therein with light reflecting surfaces).

In the conventional single-lens reflex camera provided with a built-in exposure meter, the position of a light receiving or impinging portion or member of the exposure meter is the front side of the camera, the periphery of the camera or photography lens, the reflecting mirror or in the vicinity thereof, the ground glass or in the vicinity thereof, the erect image prism or pentaprism or the vicinity thereof and the eyepiece or finder lens or the vicinity thereof. When the light receiving or impinging portion or member of the exposure meter is disposed in any of the above described positions, the volume of the camera of the type described tends to become larger. In some cases, the correct intensities of the lights from an object or scene can not be measured or the exposure meter has very complicated components such as moving members in its coupling portion to the light receiving member, so that such coupling portions are easily susceptible to breakdowns.

The reason is that in case of a camera in which is utilized a pentaprism, the light receiving member must be disposed exterior of the prism. Therefore, in order to make the whole structure of a camera compact in size, the light receiving member must be made small in size, so that the use of the light receiving member whose performance is reliable and dependable can not be made. Furthermore, the pentaprism is heavy in weight so that the increase of the weight of the camera as a whole can not be avoided.

SUMMARY OF THE INVENTION

According to the present invention, instead of the conventional pentaprism, a hollow polomirror body formed of, for example, plastic material or the like and provided therein with reflecting surfaces is used. When such a polomirror body is used in the viewfinder system of a single-lens reflex camera, the polomirror body functions in the same manner as the conventional pentaprism. Since the polo-mirror body is hollow, its weight is light and photometric means can be disposed therein.

According to one embodiment of the present invention, the light receiving member of an exposure meter is disposed within the polomirror body, in the vicinity of a viewfinder light incoming aperture of the polomirror body or of an aperture from where said lights emerge out of the viewfinder system. The light receiving member is furthermore positioned in the optical path of the viewfinder. According to another embodiment of the present invention, the light receiving member or a photometering reflecting mirror of the exposure meter is advanced into the optical path of the viewfinder only when photometering is made. In the latter embodiment, the power source circuitry of the exposure meter can be closed in response to the advancement of the light receiving or photometering reflecting mirror into the optical path of the viewfinder.

Therefore, one of the objects of the present invention is to effect the correct measurement of the intensities of the lights from an object or scene by use of a light receiving or impinging portion or member of an exposure meter whose performance is reliable and dependable.

Another object of the present invention is to make a single-lens reflex camera compact in size even though the camera is provided with a built-in exposure meter.

A still another object of the present invention is to automatically economize the power required for actuation of an exposure meter.

A yet another object of the present invention is to make a single-lens reflex camera light in weight.

The present invention will become apparent from the following description when read in the light of the accompanying drawings.

DESCRIPTION OF THE PREFERRED EMBODIMENTS

Figure 1:
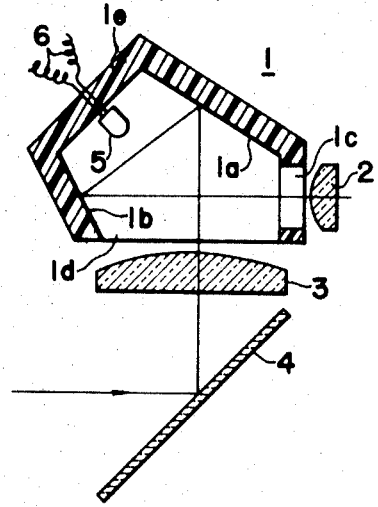
FIG. 1 is a vertical sectional view of a viewfinder of a single-lens reflex camera according to the present invention.

Referring to FIG. 1, a polomirror body 1 is of a box-shaped and made of, for example, a plastic material integrally. The polomirror 1 has a sectional view similar to that of the conventional pentaprism and has reflecting surfaces 1a and 1b provided at the inner surfaces thereof. The polomirror body 1 is further provided with a light emerging hole or aperture 1c and a light incoming hole or aperture 1d, and is mounted upon a camera body. An eyepiece or finder lens 2 is disposed exterior of the polomirror body 1 in a closely spaced apart relation with respect to the light emerging hole 1c. Also a focusing plate or ground glass 3 is disposed securely in position in the camera body exterior of the polomirror body 1 immediately below and close to the light incoming aperture 1d, and a reflecting mirror 4 is rotatably carried by the camera body as in the case of the conventional single-lens reflex camera. The above described components or members are all disposed so as to be coaxial with the optical axis of the camera. From an inner wall 1e between the reflecting surfaces 1a and 1b of the polomirror body 1 extends a light receiving or impinging portion 5 of an exposure meter consisting of a photoelectric element or photoconductive element so that the portion 5 can receive one portion of the light rays reflected by the reflecting surface 1a and directed toward the reflecting surface 1b. Lead wires 6 and 6 interconnect the light receiving or impinging portion 5 and an exposure meter (not shown). Now let it be assumed that the incident light through the camera lens is directed in the direction indicated by the arrow toward the reflecting mirror 4 where the light is reflected substantially at right angle so that an image is focused upon the ground glass 3. The light through the ground glass 3 is further directed into the polomirror body 1, reflected by the reflecting surfaces 1a and 1e and reaches the eyepiece or finder lens 2. In this case, the light receiving or impinging portion 5 of the exposure meter is viewed as a black shadow extending very slightly into the field of vision of the viewfinder, but the shape and the position at the inner surface 1e of the portion 5 are suitably designed so that the light impinging portion 5 will not adversely affect the field of vision through the eyepiece or finder lens 2.

Figure 2:
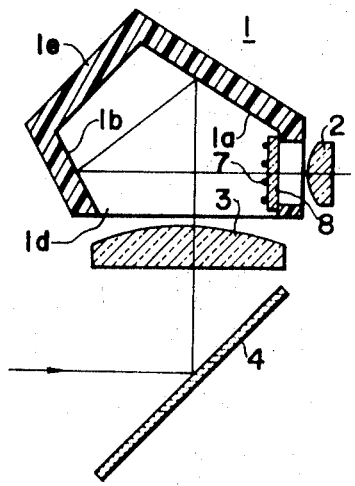
FIG. 2 is a vertical sectional view of a second embodiment of a viewfinder of the present invention.

FIG. 2 illustrates a second embodiment of the present invention wherein a transparent plate 8 provide with wire-like photoconductive elements 7 arranged in spaced apart relation from each other by a suitable distance are disposed at the light emerging aperture 2 of the polomirror body 1. The photoconductive elements 7 are adapted to receive one portion of the light reflected by the reflecting surface 1b of the polomirror body 1 toward the eyepiece or finder lens 2 so as to actuate an exposure meter (not shown) interconnected by means of lead wires to the photoconductive elements 7. In this case, since the wire-like photoconductive elements are disposed very closely to the eyepiece of finder lens 2, it is not viewed in the field of vision of the eyepiece or finder lens 2 and the field of vision is only very slightly darkened as a whole so that the photoconductive elements 7 will not interfere in viewing the image through the eyepiece or finder lens 2.

Figure 3:
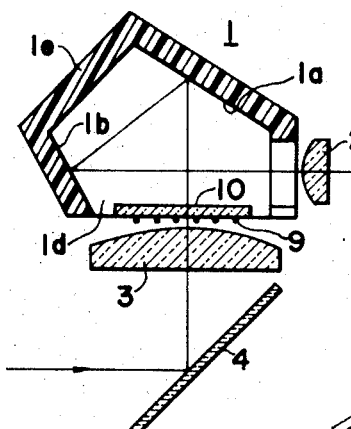
FIG. 3 is a vertical sectional view of a viewfinder system of a third embodiment of the present invention.

FIG. 3 illustrates a third embodiment of the present invention wherein at the light incoming aperture 1d of the polomirror body 1 a transparent plate 10 is disposed and provided with wirelike photoconductive elements 9 as in the case of the second embodiment described above. The photoconductive elements 9 are adapted to receive one portion of the light through the ground glass 3 toward the reflecting surface 1a of the polomirror body 1 so that photoconductive effect can be obtained thereby actuating an exposure meter (not shown) interconnected by means of lead wires to the photoconductive elements 9. In this case, when the distance between the ground glass 3 and the transparent plate 10 is maintained at a suitable distance, the wire-like photoconductive elements can be viewed only as vague, very light colored fringes so that there is no fear of interference in viewing the image through the eyepiece or the finder lens.

Figure 4:
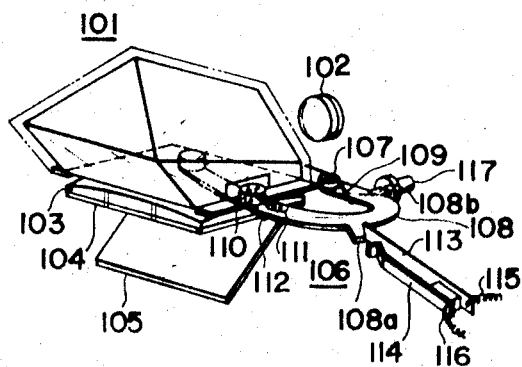
FIG. 4 is a perspective view of a fourth embodiment of a viewfinder system of the present invention.
Figure 5:
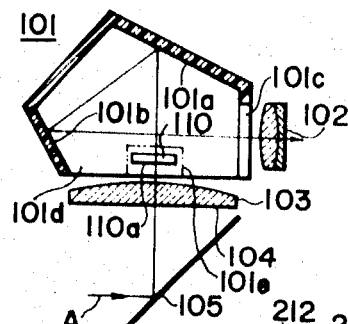
FIG. 5 is a vertical sectional view thereof.

In a fourth embodiment shown in FIGS. 4 and 5, a polomirror body 1 is also of a box-like body integrally made of a plastic material and has the same sectional view with that of the conventional pentaprism. The polomirror body 101 has reflecting surface 101a and 101b at the inner wall surfaces thereof and also a light emerging aperture 101c as well as a light incoming aperture 101d. The polomirror body 101 is also mounted on the camera body. An eyepiece or finder lens 102 is disposed exterior of the polomirror body 101 in a closely spaced apart relation with respect to the light emerging aperture 101c. Immediately below the light incoming aperture 101d and exterior of the polomirror body 101 a condenser lens 103 and a Fresnel plate 104 are mounted on the camera body. Below the Fresnel plate 104 is disposed rotatably a reflecting mirror 105 as in the case of the conventional single-lens reflex camera. The above described members or components are arranged and disposed so as to be aligned or coaxial with the optical axis of a camera or photography lens (not shown), and constitute a viewfinder optical system of a single-lens reflex camera.

Upon an upper base plate 106 secured on the upper portion of the camera body (not shown) is provided a shaft 107 which pivots a light receiving or impinging portion supporting lever 108. Between the upper base plate 106 and the lever 108 a biased spring 109 is located. At the forward end of the supporting lever 108 a light receiving or impinging portion 110 such as CdS is disposed in such a manner that a light receiving or impinging surface 110a of the portion 110 is directed downwardly, and leads 111 and 112 interconnect the portion 110 to an exposure meter circuitry. The supporting lever 108 is provided with projections 108a and 108b. Furthermore, the upper base plate 106 is provided with a movable contact 113 and a fixed contact 114 both of which are insulatingly secured to the camera body not shown and interconnected to the exposure meter circuitry by means of lead wires 115 and 116. The free end of the movable contact 113 is made in engagement with the projection 108a of the supporting lever 108 but the movable contact 113 is normally prevented from contacting the fixed contact 114 by means of the spring 109. A push-button 117 extends slidably through the upper cover (not shown) for covering the upper mechanism of the camera body, and the extended end of the push-button 117 is in engagement of the projection 108b of the supporting lever 108. Furthermore, the polomirror body 101 has a slot or aperture 101e disposed at one side wall of the polomirror body 101 in such a manner that the above described light receiving portion or member 110 is movable into and out of the interior of the polomirror body 101.

Since the light receiving portion or member 110 is normally retracted from the optical path in the viewfinder by means of the spring 109, the light A incident upon the camera or photography lens is reflected by the reflecting mirror 105 as in the case of the conventional single-lens reflex camera, passes through the Fresnel plate 104 and the condenser lens 103 and is reflected by the reflecting surfaces 101a and 101b of the polomirror body 101 respectively, thus reaching the eyepiece or finder lens 102 without being received by member 110.

When the push-button 117 is pressed, the projection 108b of the supporting lever 108 is pushed against the spring 109 so that the supporting lever 108 is caused to rotate about the pivot 107, whereby the light receiving member or portion 110 carried by the free end of the supporting lever 108 is advanced through aperture 101e into the optical path of the viewfinder within the polomirror 101. At the same time, the projection 108a is disengaged from the movable contact 113 so that the movable contact is pressed against the fixed contact 114 by the elastic force of the movable contact 113 itself whereby the exposure meter circuitry is closed, thereby permitting the intensity of the light from an object or scene to be measured.

Figure 6:
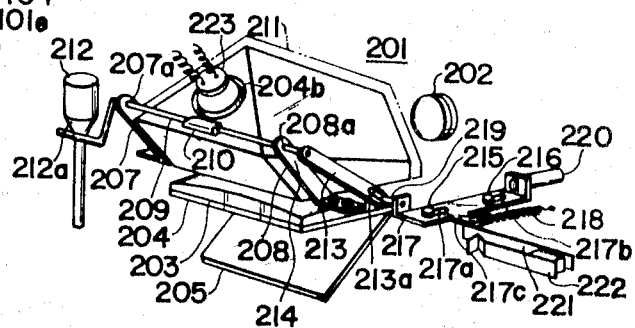
FIG. 6 is a perspective view of a fifth embodiment of a viewfinder system of the present invention.
Figure 7:
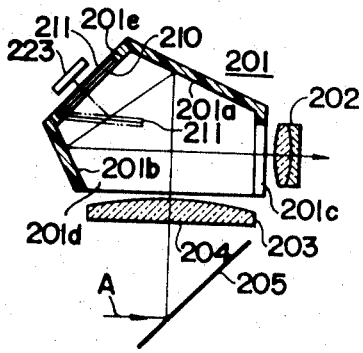
FIG. 7 is a vertical sectional view thereof.

In the fifth embodiment of the present invention shown in FIGS. 6 and 7, a polomirror body 201 is of a box-type made integrally of plastic material and has a sectional view similar to that of the conventional pentaprism. As in the case of the above described embodiments, the polomirror body 201 has reflecting surfaces 201a and 201b at the inner wall surfaces thereof and a light emerging aperture 201c and a light incoming aperture 201d. The polomirror body 201 is adapted to be mounted upon the camera body. An eyepiece or finder lens 202 is disposed exterior of the polomirror body 201 in a closely spaced apart relation with respect to the light emerging aperture 201c. Immediately below and close to the light incoming aperture 201d and exterior of the polomirror body 201 are disposed a condenser lens 203 and a Fresnel plate 204 both of which are fixedly secured to the camera body. As in the case of the conventional single-lens reflex camera, a reflecting mirror 205 is rotatably secured to the camera body below the Fresnel plate 204. The above described components or members are arranged and disposed so as to be aligned or coaxial with the optical axis of a camera or photography lens, and constitute a viewfinder optical system of a single-lens reflex camera.

Two supporting frames 207 and 208 are fixedly secured to an upper base plate (not shown) which in turn is fixedly secured to the camera body. The supporting frames 207 and 208 have shaft receiving holes 207a and 208a respectively through which is loosely fitted a shaft 209 which in turn carries a frame 210 for supporting a light measurement reflecting mirror securely fixed thereto. The supporting frame 210 has the light measuring reflecting mirror fixedly secured thereto. Furthermore, one end of the shaft 209 is made into the form of a crank which engages with the tapered portion 212a of a release button 212, and the other end of the shaft 209 is connected to one end of an interlocking lever 213 whose free end is provided with an elongated slot 213a. Between the supporting frame 208 and the interlocking lever 213 a biased spring 214 is located. Pivots 215 and 216 provided upon the upper base plate 206 are fitted into elongated slots 217a and 217b of a sliding lever 217 respectively. A spring 218 is located between the sliding lever 217 and the upper base plate. The sliding lever 217 is provided with a pin 219 and a push-button 220, the pin 219 being fitted into the enlongaded slot 213a of the interlocking lever 213. The push-button 220 is so arranged and disposed that it may extend outwardly slidably through an upper cover (not shown) which covers the upper mechanism of the camera. Furthermore, upon the upper base plate are disposed a movable contact 221 and a fixed contact 222 both of which are insulated against the camera body. The movable contact 221 is adapted to engage with a projection 217c of the sliding lever 217 which is biased toward the push-button 220 by the spring 218 so that the contact 221 is normally not engaged with the fixed contact 222.

At the front surface of the polomirror body 201 is provided a through hole or aperture 201e, and a reflecting mirror 211 is carried by the shaft 209 at such a position that the mirror 211 is normally in alignment with the aperture 201e. Therefore, when the shaft 209 is rotated so that the reflecting mirror 211 is advanced into the polomirror body 201 to a position shown by the two-dot chain line in FIG. 7, the light through the camera or photography lens is reflected by the reflecting surface 201a of the polomirror body 201 and is further reflected by the reflecting mirror 211. A light receiving or impinging portion 223 of an exposure meter is located closely adjacent to aperture 201e as shown in FIG. 7 so that the above described reflected light impinges thereupon. The photometering reflecting mirror 211 is normally positioned, as shown in full lines in FIG. 7, by means of the springs 214 and 218, and in this condition, the optical path of the viewfinder is not intercepted by the reflecting mirror 211. When the pushbutton 220 is depressed against the spring 218, the pin 219 pushes the free end of the interlocking lever 213 so as to rotate the shaft 209, whereby the photometering reflecting mirror 211 fixedly secured to this shaft 209 is also caused to rotate and advance into the position shown by the two-dot chain line in FIG. 7. One portion of the incident light A through the camera or photography lens is reflected by the photometering reflecting mirror 211 and reaches the light receiving or impinging portion or member 223. At the same time, the projection 217c pushes the movable contact 221 so as to engage the contact 221 with the fixed contact 222, whereby the exposure meter circuitry is closed, thereby permitting the measurement of the intensities of the lights from an object or scene. When the release button 212 is depressed independently of the push-button 220, the extremity of the shaft 209 is pushed by the lower tapered portion 212a of the release button 212 so that the shaft 209 is caused to rotate, whereby the measurement of the intensities of the lights from an object or scene can be effected in the same manner as described above when the push-button 220 is depressed.

Figure 8:
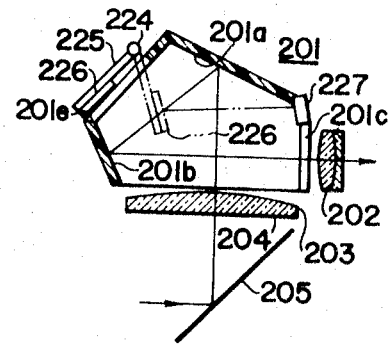
FIG. 8 is a vertical sectional view of a sixth embodiment of a viewfinder system of the present invention.

Now referring to FIG. 8, a shaft 224 which is similar to the shaft 209 in the fifth embodiment is rotatably disposed upwardly and closely to the through hole or aperture 201e of the polomirror body 201 in such a manner that the shaft 224 can be rotated through a predetermined angle from a suitable means disposed exterior of the camera body. In the position along the shaft 224 corresponding to the position of the through aperture 201e, a reflecting mirror supporting frame 225 whose free end portion carries a photometering reflecting mirror 226 is fixed to shaft 224. A light receiving or impinging portion or member 227 of an exposure meter is disposed outside of the optical path of the viewfinder and inwardly of the light emerging aperture 201c of the polomirror body 201. When the photometering reflecting mirror 226 is rotated through the predetermined angle so as to be advanced into the position within the polomirror body 201 indicated by the two-dot chain line in FIG. 8, the light through the camera or photography lens is reflected by the reflecting surface 201a and is further reflected by the photometering reflecting mirror 226 so that the light is made incident upon the light receiving or impinging portion or member 227. Thus, the measurement of the intensities of the lights from an object or scene can be effected in a quite similar manner as described above with reference to the embodiments of the present invention.

The present invention has been described hereinbefore with particular reference to preferred embodiments thereof, but it will be clear to those skilled in the art that variations and modifications can be effected within the spirit of the present invention as described hereinabove and as defined in the appended claims.

We claim:

1. An exposure meter device for use with a single-lens reflex camera comprising:
   a polomirror body having an entrance opening through which light enters on an optical path, and an exit opening through which the light leaves on said path,
      at least two opposing reflecting surfaces located in said optical path on the inside of said polomirror body;
   a light receiving portion adapted for positioning within said polomirror body to receive light rays reflected from said inside surfaces;
   means adapted to connect said light receiving portion for exposure measurements; and
   said light receiving portion being located at the inside of the exit opening.

2. An exposure meter device for use with a single-lens reflex camera comprising:
   a polomirror body having an entrance opening through which light enters on an optical path, and an exit opening through which the light leaves on said path,
      at least two opposing reflecting surfaces located in said optical path on the inside of said polomirror body;
   a light receiving portion adapted for positioning within said polomirror body to receive light rays reflected from said inside surfaces;
   means adapted to connect said light receiving portion for exposure measurement; and
   said light receiving portion being located at the inside of the entrance opening.

3. An exposure meter device for use with a single-lens reflex camera comprising:
   a polomirror body having an entrance opening through which light enters on an optical path, and an exit opening through which the light leaves on said path,
      at least two opposing reflecting surfaces located in said optical path on the inside of said polomirror body;
   a light receiving portion adapted for positioning within said polomirror body to receive light rays reflected from said inside surfaces;

means adapted to connect said light receiving portion of exposure measurement;

a slot being provided in said polomirror body;

a pivotal element being movable into and out of said slot;

said light receiving portion being mounted on the end of said pivotal element that is movable into said polomirror body;

spring means being connected to said pivotal element normally holding the end thereof out of said slot;

said connecting means being normally disconnected from said light receiving portion; and means being actuable to release said spring means so that said pivotal element is movable into said slot and simultaneously provides a connection between said connecting means and said light receiving portion.

4. An exposure meter device for use with a single-lens reflex camera comprising:

a polomirror body having an entrance opening through which light enters on an optical path, and an exit opening through which the light leaves on said path, at least two opposing reflecting surfaces located in said optical path on the inside of said polomirror body;

a light receiving portion adapted for positioning within said polomirror body to receive light rays reflected from said inside surfaces;

means adapted to connect said light receiving portion for exposure meansurement;

said reflecting surfacing comprising two surfaces angularly disposed with respect to each other and connected by a wall having an opening therein; and said light receiving portion being pivotally mounted to be moved through said opening into the optical path within said polomirror body.

5. An exposure meter device for use with a single-lens reflex camera comprising:

a polomirror body having an entrance opening through which light enters on an optical path, and an exit opening through which the light leaves on said path, said polomirror body having two internally opposing reflecting surfaces located in said optical path connected by a wall having an opening therein;

a frame mounted on said wall and adapted to be pivotally swung through said wall opening into said polomirror body, said frame including a reflecting surface positionable in the optical path between said two reflecting surfaces;

a light receiving portion positioned outside of said polomirror body closely adjacent said wall opening to receive light rays reflected from said frame reflecting surface; and means adapted to connect said light receiving portion for exposure measurement.

6. Device according to claim 5, in which actuable lever means are provided for swinging said frame into its internal position, said connecting means is normally disconnected from said light receiving portion, and means is actuable to swing said frame into its internal position and simultaneously provide a connection between said connecting means and said light receiving portion.

References Cited

UNITED STATES PATENTS

| 3,080,803 | 3/1963 | Uno | 95—10 |
| 3,091,161 | 5/1963 | Matsumoto | 95—10 |

FOREIGN PATENTS

| 1,266,631 | 4/1968 | Germany | 95—42 |

SAMUEL S. MATTHEWS, Primary Examiner

R. L. MOSES, Assistant Examiner

U.S. Cl. X.R.

95—10 C